Oct. 20, 1936.　　C. S. BRAGG ET AL　　2,057,704

BRAKE

Filed Feb. 7, 1934　　2 Sheets-Sheet 1

INVENTORS
Caleb S. Bragg
BY Victor W. Kliesrath
Jerome R. Cox
ATTORNEY.

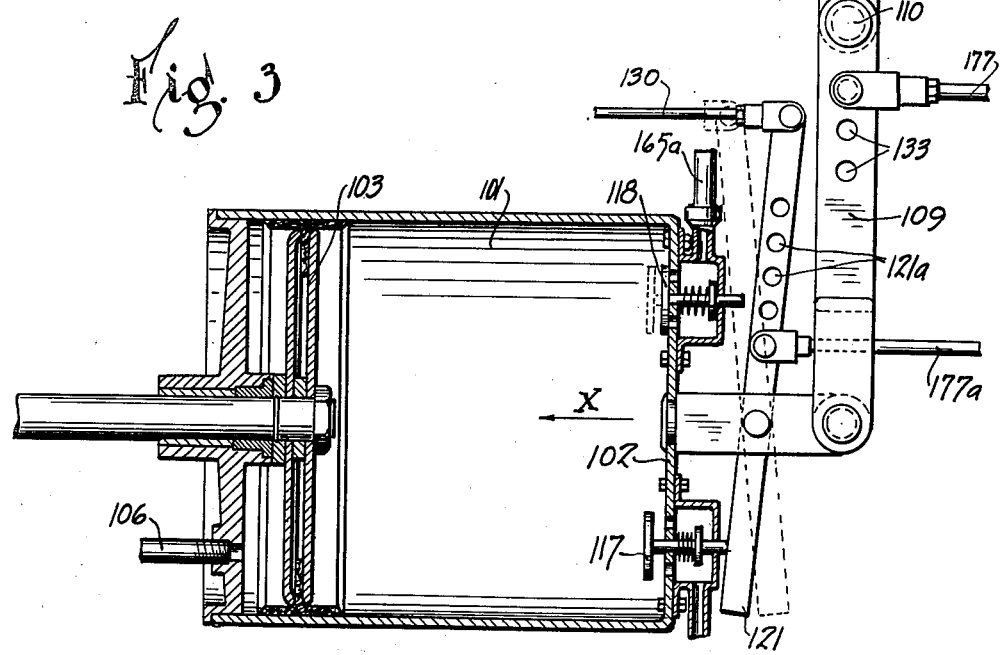
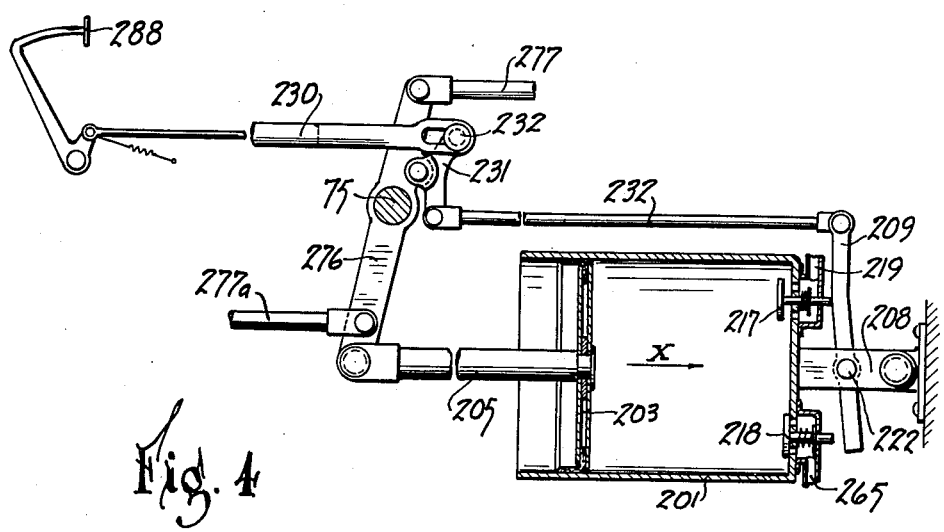

Patented Oct. 20, 1936

2,057,704

UNITED STATES PATENT OFFICE 2,057,704

BRAKE

Caleb S. Bragg, Palm Beach, Fla., and Victor W. Kliesrath, South Bend, Ind., assignors to Bragg-Kliesrath Corporation, South Bend, Ind., a corporation of New York Application February 7, 1934, Serial No. 710,074

7 Claims. (Cl. 188—152)

This application is in part, a continuation of our Patent No. 1,958,415 issued May 15, 1934. The disclosure of Figures 2 and 3 hereof is identical with matter disclosed but not claimed in said patent.

Our invention consists in the novel features hereinafter described, reference being had to the accompanying drawings which show several embodiments of the invention selected by us for purposes of illustration, and the said invention is fully disclosed in the following description and claims.

An object of our invention is to provide a vacuum brake system for automotive vehicles of novel construction, which is extremely simple and cheap to manufacture.

One feature of the invention is that the controlling valve mechanism for the actuator is carried by the cylinder of the actuator and is operated by a lever pivotally mounted on said cylinder and connected with a physically operable controlling part.

The structure is adapted to be used with a power actuator in which the piston is submerged in vacuum, or with a power actuator in which the piston is submerged in air.

Referring to the accompanying drawings which illustrate the embodiment of the invention selected by us for purposes of illustration:

Figure 3 is a view similar to Figure 2 illustrating the modification; and

Figure 4 is a view in perspective illustrating a further modification.

Figure 1:
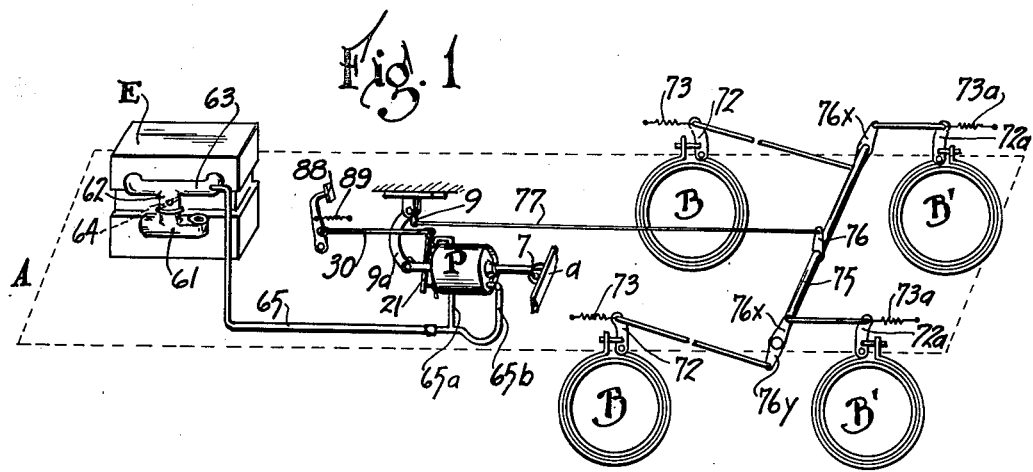
Figure 1 is a diagrammatic view of a brake system for automotive vehicles embodying our present invention.
Figure 2:
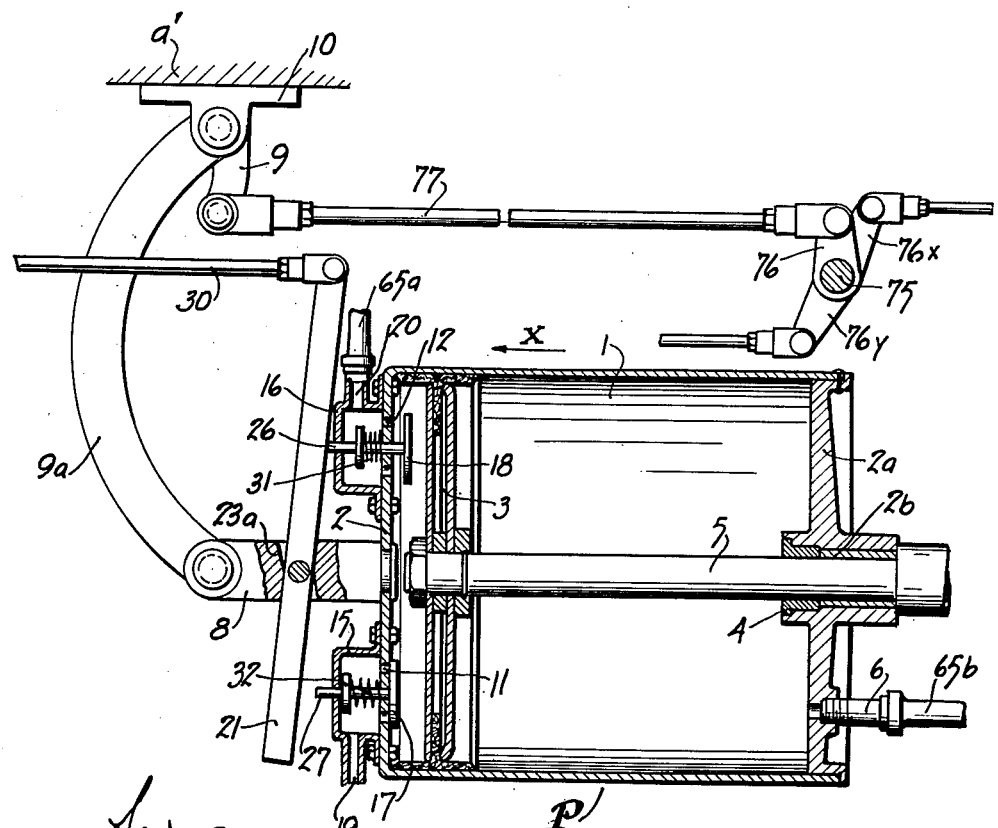
Figure 2 is an enlarged detail view partly in section of a portion of the apparatus shown in Figure 1.

In Figure 1 we have shown diagrammatically the automotive vehicle indicated by dotted lines at A provided with an internal combustion engine indicated at E for propelling the same and equipped with brake mechanism for a plurality of wheels of the vehicle indicated at B, B, and B', B'. It will be understood that the brake mechanisms here diagrammatically shown as being of the drum and brake band type, for illustrative purposes, may be of any desired form and operated in any desired manner and upon any wheels of the vehicle, but in the present instance we have shown the brakes B, B, having their actuating levers 72, 72 operatively connected with a rock shaft 75 for joint operation and restored to released position by the usual springs 73, the brake mechanisms B', B' having their actuating levers 72ª similarly connected to the rock shaft 75, said brake mechanisms being returned to released position by the usual springs indicated at 73ª. The engine E is provided with the usual carburetor 61 and with a suction passage comprising the vertical portion 62 provided with the usual throttle valve 64 and the usual intake manifold 63. The vacuum for operating the power actuator is conveniently obtained by a suction pipe 65 connected to the intake manifold 63 between the throttle valve and the engine cylinders. P represents a power actuator shown enlarged in section in Figure 2 and comprising a cylinder 1 which is preferably of drawn wrought metal having an integral head 2, the opposite end of the cylinder being provided with a separably formed head 2ª provided with a guiding sleeve 2ᵇ to receive the piston rod 5 of the piston 3, said sleeve being provided with suitable sealing means indicated at 4 engaging the piston rod. The head 2ª of the cylinder is provided with a nipple 6 which is connected with a suction pipe 65ᵇ in turn connected with the main suction pipe 65. In this instance, the piston rod 5 is shown pivoted at 7 to a stationary part a of the chassis and the cylinder head 2 is provided with a bracket 8 pivotally connected with the power applying lever 9ª, the opposite end of which is pivotally supported at 10 from a portion of the chassis indicated at a'. The power actuator is, therefore, supported by the pivotal connection 7 of the piston rod 5 with the chassis and by the pivotal connection of the cylinder 1 with the lever 9ª, and the cylinder 1 is the movable member of the actuator.

The cylinder 1 is shown provided with a very cheap, simple, and effective form of controlling valve mechanism. The head of the cylinder, preferably the integral head 2, is provided with two groups of apertures 11 and 12. The head 2 of the cylinder 1 is also provided with a pair of poppet valves 17 and 18 for closing apertures 11 and 12 respectively. Valve stems 26 and 27 extend through valve casings 15 and 16 provided with nipples 19 and 20 respectively and the valve stems are provided with springs 31 and 32 normally tending to seat the valves. The outer ends of the valve stems extend into a position to be operated by the valve actuating lever 21 which is pivotally mounted on the movable member of the actuator. In this instance it is pivoted at 22 in an aperture 23 extending through the bracket 8 which is riveted or otherwise secured to the center of the cylinder head 2. The lever 21 is shown in this instance pivotally connected at its upper end with a link rod 30, the forward end of which is connected to a pedal lever 88 provided with the usual retracting spring 89. No reactionary force operative on the pedal is provided, but the relative movement between the valve actuating lever and the cylinder can be taken up either by the shoulders 23ᵃ in the bracket 8 or by the engagement between the lower end of the lever 21 and the valve casing 15 so that the operator can apply his physical force to the brake mechanisms through the lever 9ᵃ and operate the brakes by physical force alone in case of failure of power. The forward end of the cylinder is supported by the arm 9ᵃ of the power applying lever which is pivotally mounted on the chassis at 10 and has its lower end connected to the bracket 8. This power applying lever is provided with an arm 9 connected by a link 77 with the brake mechanisms to be operated. In this instance the link 77 is shown connected to an arm 76 on a rock shaft 75 to which one or more pairs of brake mechanisms may be connected. The shaft 75 is in this instance provided with arms 76ˣ and 76ʸ, each one of which is shown for operating either the front or the rear wheel brakes. 18 is a suction valve which is normally held in open position by the valve actuating lever 21, the suction pipe 65 from the intake manifold having branches 65ᵃ and 65ᵇ connected with the nipple 20 of the suction valve casing and with the nipple 6 communicating with the cylinder on the opposite side of the piston. It will thus be seen that in the released position of the parts, the cylinder will be evacuated on both sides of the piston and the piston will be submerged in vacuum. The nipple 19 is connected to the atmosphere. The valve actuating lever 21 is connected by the link 30 with the pedal.

To apply the brakes, the operator will depress the pedal and move the upper end of the lever 21 forwardly so as to permit the suction valve to close and so as thereafter to open the air valve 17. He thus admits air between the cylinder head 2 and the piston tending to equalize pressures on the head 2. The air pressure on the exterior face of the head 2ᵃ (the inner face of which is always subjected to maximum vacuum) will move the cylinder I in the direction of the arrow x, thereby applying the brakes through the lever 9, 9ᵃ.

In Figure 3, like parts are shown and designated by similar numerals with one hundred added. The nipple 106, however, is connected to the air at all times and the cylinder is turned around so that the rod 130 connected to the pedal extends in the opposite direction relative to the cylinder. Thus the valve 117 is normally opened, the valve 118 is normally closed, and the piston 103 is normally maintained suspended in air instead of in vacuum. The lever 109 pivoted at 110 on a fixed portion of the chassis may be connected directly to the link 177 extending to one set of brakes and the link 177ᵃ connected to the other set of brakes may be connected to the valve actuating lever 121. A plurality of holes 133 may be provided in the lever 109 so that the point of connection with the link 177 and therefore, the brake applying leverage may be adjusted. Similarly, a plurality of holes 121ᵃ may be provided for adjustably connecting the link 177ᵃ to the lever 121.

In the operation of this embodiment, a pull exerted upon the link 130 first closes the valve 117 and thereafter opens the valve 118. The manifold suction withdraws air from the cylinder 111 through the conduit 165ᵃ, and atmospheric pressure acting upon the head 102 forces the cylinder 101 in the direction of the arrow x, thus applying the brakes through the links 177 and 177ᵃ.

In Figure 4, a further modification is shown. Therein the cylinder 201 is secured to a fixed portion of the chassis of the vehicle and the piston 203 is movable relative thereto. The piston 203 is connected by means of a piston rod 205 with a lever 276 secured to the cross shaft 75 and thus operates to rotate the cross shaft 75. Rotation of the cross shaft 75 and the lever 276 secured thereto exerts brake applying force upon the links 277 and 277ᵃ. The interior of the cylinder 201 is normally filled with air at atmospheric pressure which enters through the nipple 219 past the normally open valve 217. When it is desired to apply the brakes, pressure by the foot upon the pedal 288 acts through the link 230 to rotate the auxiliary lever 231 pivoted upon the lever 276 and thus exerts a thrust upon compression link 232. This rotates the lever 209 about its pivot 222 upon the bracket 208 and closes the valve 217. Immediately thereafter, it opens valve 218, thus allowing the manifold suction to withdraw air from the interior of the cylinder 201. Atmospheric pressure acting upon the opposite face of the piston 203 forces the piston in the direction of the arrow x and thus rotates the lever 276 and applies the brakes.

To provide positive mechanical application of the brakes in event of failure of the power actuating means, link 230 is bifurcated at its end embracing lever 276 and lever 231 is bifurcated at its pivotal connection with lever 276. Thus, the connection 232 of link 230 and lever 231 will engage lever 276 after a predetermined movement and positively rotate the rock shaft 75 to apply the brakes.

It is to be understood that the above described embodiments of our invention are for the purpose of illustration only, and various changes may be made therein without departing from the spirit and scope of the invention.

What we claim is:

1. In a brake system for automotive vehicles, the combination with a power actuator comprising a cylinder and a piston, one of which is movable with respect to the chassis of the vehicle and the other of which is connected with and supported by the chassis, controlling valve mechanism for the actuator supported by the cylinder comprising a pair of valve elements each formed with the valve stem which extends through the end of the cylinder to outside of the cylinder, connections from the movable member of the actuator to the brake mechanism for the vehicle, a valve actuating lever pivotally connected with and supported by the cylinder at a point intermediate said valve stems and at times contacting with said valve stems, one on one side of its pivotal support and the other on the other side of its pivotal support, a physically operable part, and connections between it and said valve actuating lever.

2. In a brake mechanism for automotive vehicles, the combination with a power actuator comprising a cylinder and a piston, one of which is movable with respect to the chassis and the other of which is connected with a fixed part of the chassis, a power applying lever connected with the movable member of the actuator and pivoted on the fixed part of the chassis, controlling valve mechanism for the power actuator carried by the cylinder comprising a pair of valve elements each provided with a valve stem extending through the head of the cylinder to the exterior thereof, a valve actuating lever pivotally connected with and supported by the cylinder intermediate said valve stems and at times contacting with said valve stems, one on one side of the pivotal support and the other on the other side of the pivotal support, a physically operable part, connections therefrom to the valve actuating lever, brake mechanisms for the vehicle, and connections from said power applying lever to said brake mechanisms.

3. In a brake system for automotive vehicles, the combination of a power actuator having relatively movable members and comprising a cylinder formed with a head having apertures therein and a piston for said cylinder; means for connecting said actuator alternately with sources of high and low pressures, said means comprising valve mechanism, including a pair of members, a stem secured to one of said members and projecting through one of said apertures, and a casing exterior of said head and covering the aperture through which said stem extends; brake mechanism operatively connected with a movable member of the actuator; and a physically operable control member connected with said valve members.

4. In a brake system for automotive vehicles, the combination of a power actuator having relatively movable members and comprising a cylinder formed with a head having apertures therein and a piston for said cylinder; means for connecting said actuator at times with a source of high pressure or with a source of low pressure, said means comprising valve mechanism including a pair of valve elements, a stem secured to one of said elements and projecting through one of said apertures, and a casing exterior to said head and covering the aperture through which said stem extends; brake mechanism operatively connected with a movable member of the actuator; and a physically operable pedal connected with said valve elements.

5. In a brake system for automotive vehicles, the combination of a power actuator having relatively movable members and comprising a cylinder formed with a head having apertures therein and a piston for said cylinder; means for connecting said actuator alternately with sources of high and low pressures, said means including valve mechanism comprising a pair of members, a stem secured to one of said elements and projecting through one of said apertures, a casing exterior of said head and covering the aperture through which said stem extends, and a spring surrounding said stem and bearing upon said casing; brake mechanism operatively connected with a movable member of said actuator; and a physically operable control member connected to said valve member.

6. In a brake system for automotive vehicles, the combination of a power actuator having relatively movable members and comprising a cylinder formed with a head having apertures therein and a piston for said cylinder; means for connecting said actuator alternately with sources of high and low pressures, said means including valve mechanism comprising a pair of members, a stem secured to one of said elements and projecting through one of said openings; brake mechanism operatively connected with a movable member of the actuator; a physically operable control member; a lever pivoted upon said head exterior of said cylinder and adapted to actuate said valve stem; and means connecting said lever to the physically operable part.

7. In a brake system for automotive vehicles, the combination of a power actuator having relatively movable members, and comprising a cylinder formed with a head having apertures therein and a piston for said cylinder; means for connecting said actuator alternately with sources of high and low pressures, said means including valve mechanism comprising a pair of members positioned within the cylinder, and adapted to be moved to close said openings, a stem secured to one of said elements and projecting through one of said openings, a casing exterior of said head and covering the opening through which said stem extends, and a spring surrounding said stem; brake mechanism operatively connected with a movable member of the actuator; a physically operable control member; a lever pivoted upon said head exterior of said cylinder and adapted to actuate said valve stem; and means connecting said lever to the physically operable part.

CALEB S. BRAGG.
VICTOR W. KLIESRATH.